May 27, 1969  R. F. KRATOCHVIL ET AL  3,446,358
DEVICE FOR SEPARATING PLATES AND FRAMES OF FILTER PRESSES
Filed June 23, 1966                                    Sheet 1 of 4
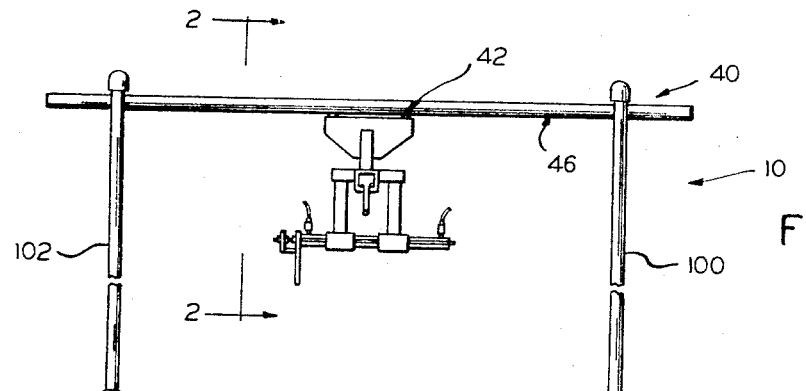
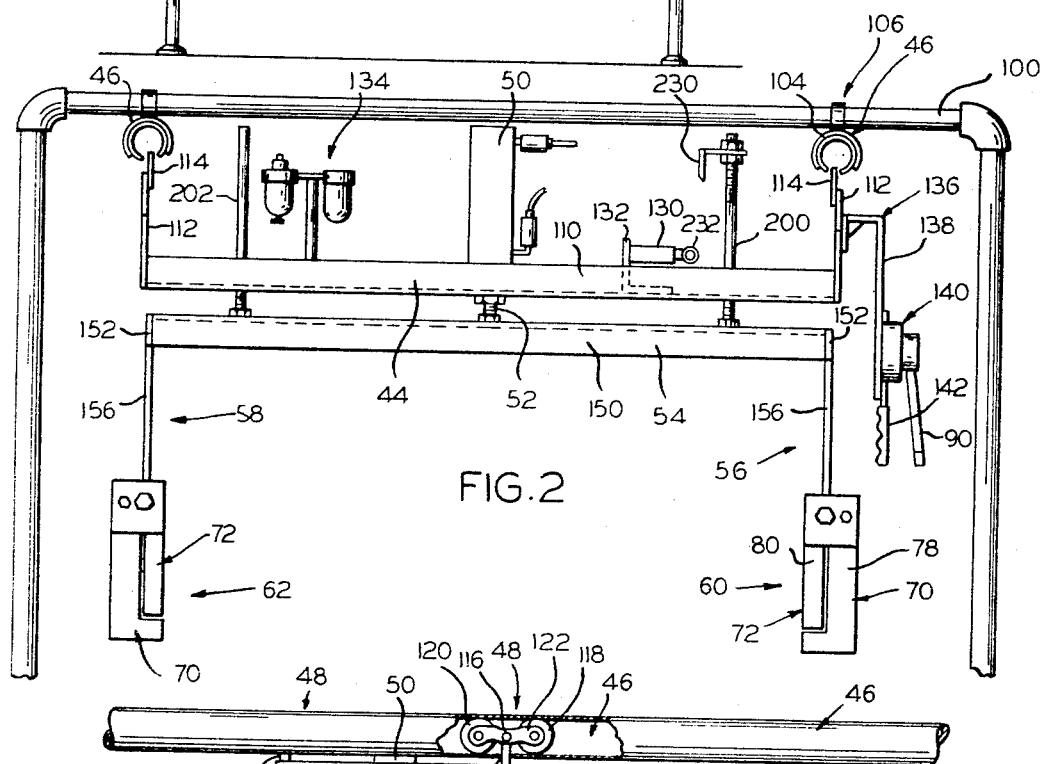
INVENTORS
RUSSELL F. KRATOCHVIL
WILLIAM C. EGGERT
BY
Mann, Brown + McWilliams
ATTORNEYS

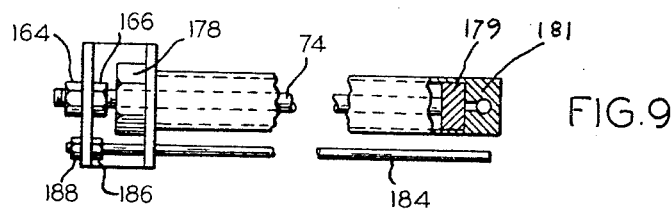
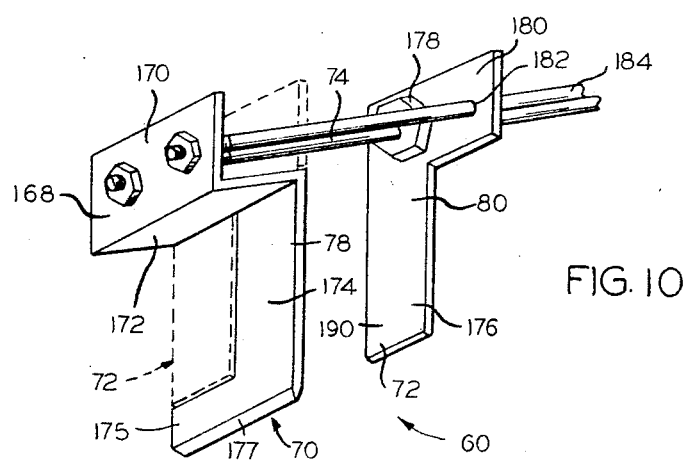
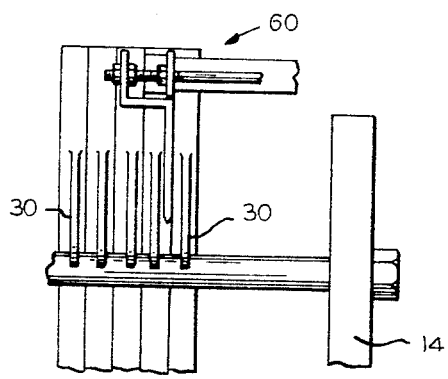
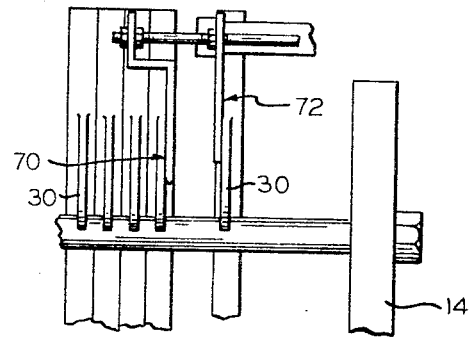

INVENTORS
RUSSELL F. KRATOCHVIL
WILLIAM C. EGGERT

United States Patent Office 3,446,358
Patented May 27, 1969

3,446,358
DEVICE FOR SEPARATING PLATES AND FRAMES OF FILTER PRESSES
Russell F. Kratochvil, North Aurora, and William C. Eggert, Aurora, Ill., assignors to D. R. Sperry & Co., a corporation of Illinois
Filed June 23, 1966, Ser. No. 559,760
Int. Cl. B01d 25/32
U.S. Cl. 210—230                                           7 Claims

ABSTRACT OF THE DISCLOSURE

A device for separating filter press units of a filter press, such as filter press plates and frames, wherein a pair of composite dogs, each including substantially planar portions disposed to be placed in coplanar relation, are positioned on either side of a filter press, and to separate adjacent filter press units, the planar portions of the respective dog pairs are positioned between the handles of an adjacent pair of such filter press units, and one member of each dog pair is moved relative to the other member thereof and against the corresponding handle of the filter press unit to be separated.

---

Our invention relates to a device for separating plates and frames of filter presses, and more particularly, to a device for separating and shifting filter press plates, or filter press plates and frames (as the case may be), when it becomes necessary to open and close the plates and frames of the press, as for purposes of cleaning same and changing the filter media, etc.

After a period of use, the length of which depends upon the materials being filtered, the plates and frames of filter presses generally have to be separated for cleaning purposes and replacement of the filter media (in presses employing recessed plates, frames are not used but separation of the plates is still required for these purposes).

This operation has long been a problem in the industry since the units comprising the individual plates and frames not only tend to stick together due to the viscosity of the media being filtered, they are ordinarily quite massive and they are supported on the press solely by engagement of their laterally extending handles or arms with the side bars or rails of the press frame.

Thus, when separation is to be effected, care must be taken to avoid twisting or cocking the plate or frame too much out of its normal transverse positioning with respect to the press frame, as the plate or frame may otherwise fall to the floor between the frame side bars, with the known consequent probable results.

Also, the plates and frames should be consecutively separated from each other since if two or more are separated from the others as a unit, they are most difficult to pry apart and as a matter of fact we are aware of no conventional device for doing this effectively.

Heretofore devices for separating plates and frames have been confined to quite crude hand operated levers or jacks, except in the case of the more expensive presses which sometimes have built into them endless chain and lug arrangements that are motor driven in being used to separate the plates and frames. In practice, it has been found that these devices are not consistently effective since actually they rely on there being on adhesion between the plates being separated to oppose the forces effecting plate and frame separation. However, some adhesion frequently occurs, as where viscous material and the like have been filtered, which adhesion is unpredictably variable and frequently fails between the wrong plates, or plates and frames, leaving the operator with a separated unit of two or more joined plates to separate by hand tools. No devices of this type are known to be in existence which insure that each plate and frame is individually separated from its neighbor.

A principal object of this invention is to provide a device for separating plates and frames of filter presses which insures that the individual plates and frames in the act of being separated will remain in their normal positioning transversely of the press, and that each plate and frame will be separated from that adjacent it, while avoiding the need for any special designing of either the press or its plates and frames.

Another principal object of the invention is to provide a device for separating plates and frames that may be readily employed in connection with a wide variety of filter press arrangements, and especially those which are not equipped with their own devices for separating their plates and frames.

Still another principal object of the invention is to provide a practical plate and frame shifting device that keeps the forces involved in separating the plates and frames limited to the individual plates and frames that are being separated.

Other objects of the invention are to provide a simplified plate and frame separating device that may be readily shifted from one press to another, to provide a plate and frame shifter that can be employed to close plates and frames as well as separate them, and to provide a plate and frame shifting or separating device that is economical of manufacture, convenient in use, and is applicable to a wide variety of press arrangements.

Other objects, uses, and advantages will be obvious or become apparent from a consideration of the following detailed description and the application drawings.

In the drawings:

FIGURE 1 is a small scale side elevational view of one embodiment of the invention arranged for application to a filter press;

FIGURE 2 is a sectional view substantially along line 2—2 of FIGURE 1 but on an enlarged scale;

FIGURE 3 is a fragmental elevational view taken from the right hand side of FIGURE 2, with parts broken away;

FIGURE 9 is a fragmental plan view taken substantially along line 9—9 of FIGURE 3;

FIGURE 10 is a diagrammatic perspective view better illustrating the components of the dog device of FIGURES 3 and 9;

Figure 7:
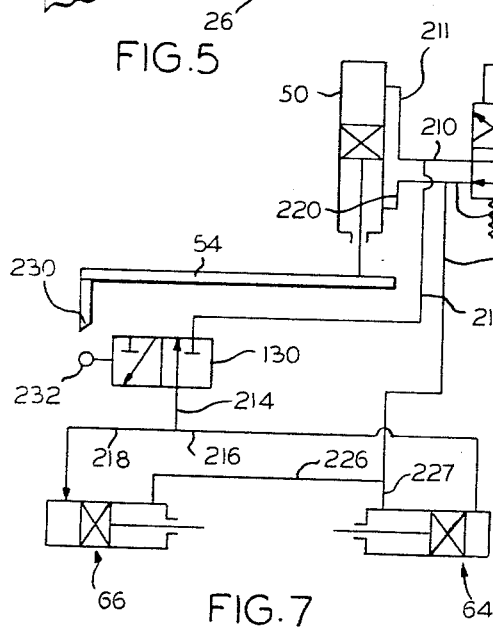
FIGURE 7 is a schematic view illustrating the air flow and conduiting arrangement employed in connection with the specific embodiment of FIGURES 1–6.
Figure 8:
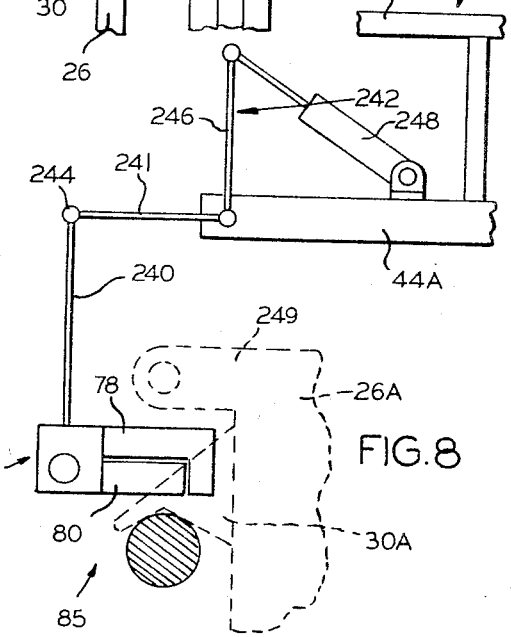
FIGURE 8 is a fragmental view on the order of that of FIGURE 2 illustrating a modified form of the invention.
Figure 13:
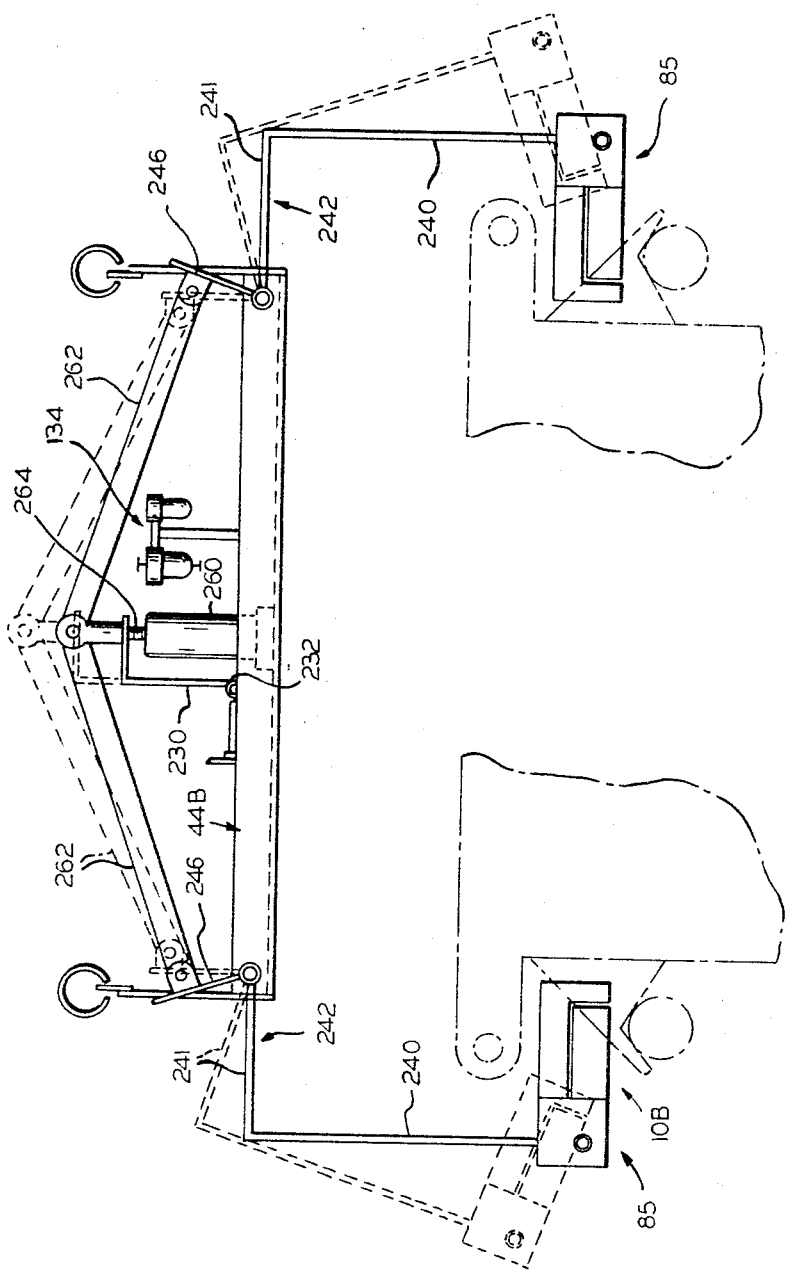

FIGURES 11 and 12 indicate how the device of FIGURES 1–7 may be employed to close the plates and frames; and FIGURE 13 is a view similar to that of FIGURE 2, but illustrating a variation of the arrangement of FIGURE 8.

However, it is to be understood that the specific embodiments illustrated are supplied primarily to comply with the requirements of the patent code and that the invention may have other embodiments that will be obvious to those skilled in the art.

General description

Figure 4:
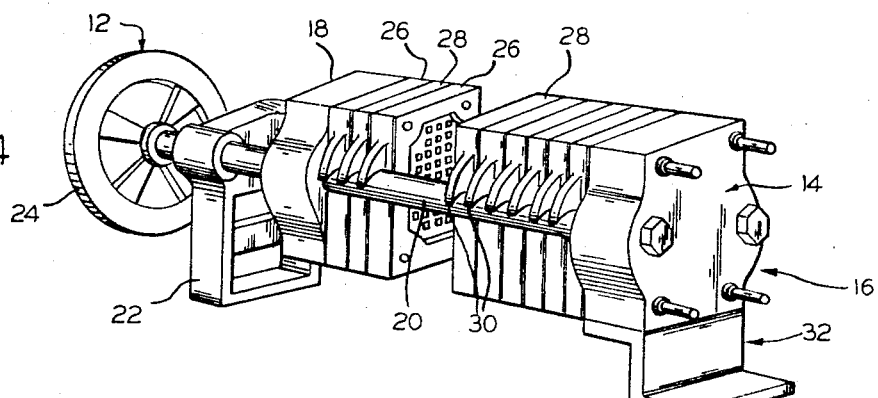
FIGURE 4 is a perspective view illustrating a typical filter press unit to which the invention is applicable.
Figure 5:
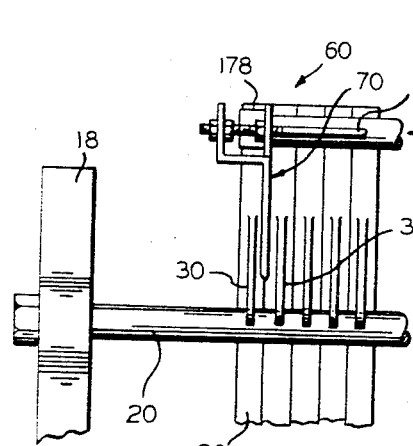
FIGURES 5 and 6 illustrate the manner in which the invention may be employed to separate individual plates and frames.
Figure 6:
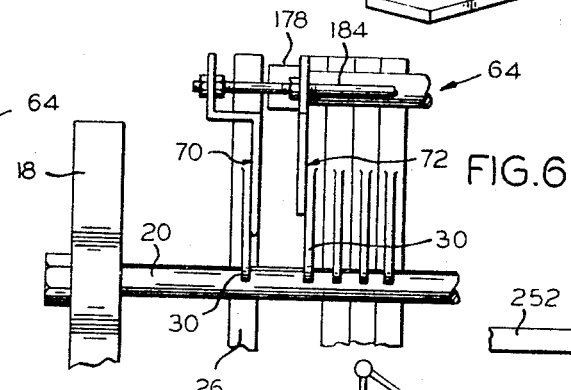

Reference numeral 10 of FIGURE 1 generally indicates a proven embodiment of the invention that is arranged for application to a filter press of the general type indicated at 12 in FIGURE 4.

As is well known in the industry, a filter press is a press or device to hold together the component parts of a filter which in turn is a device for separating solids and liquids. The familiar parts of a filter press are diagrammatically illustrated in FIGURE 4 including the fixed head 14 which forms a part of fixed end support 16, the slide or movable head 18 that is mounted on the side rails or bars 20 which extend between the fixed head and a fixed support 22 at the other end of the filter press, which slide or movable head is moved into place by operating a well-known screw member as by employing a familiar type of actuation gear 24, with the plates and frames 26 and 28 being applied in alternate relation between the fixed and movable heads and transversely of side rails or bars 20. In the form of filter press shown, conventional flush plates and frames are illustrated, but as is well known, where recessed plates are employed in connection with the apparatus 12 (which readily can be substituted for the plates and frames 26 and 28) no frames are used.

As is conventional in this industry, the plates and frames are each provided with laterally extending handles or arms 30 that are generally planar in configuration and engage the side rails or bars 20 on either side of the filter press.

The fixed head 16, side rails or bars 20, and the support 22 define a filter press frame generally indicated at 32.

The specific device 10 illustrated comprises a frame 40 of generally U-shaped configuration which is positioned over the filter press to be worked on and has applied thereto a trolley structure 42 comprising a bridge 44 (see FIGURE 2) suspended from trackway forming rails 46 by suitable roller assemblies 48, one of which is diagrammatically illustarted in FIGURE 3.

Bridge 44 carries pneumatic cylinder device 50 from which extends piston rod 52 that is connected to a vertically movable head or beam 54 which has fixed to either end thereof bracket structures 56 and 58 that carry the novel composite dog devices 60 and 62 together with their operating pneumatic cylinder devices 64 and 66.

The dog devices 60 and 62 each comprise a pusher dog member 70 and a hold-back dog member 72, with the pusher dog members of the respective composite dogs 60 and 62 being made fast with respect to the piston rods 74 (see FIGURES 9 and 10) of the respective cylinder devices 64 and 66, and the respective dog members 72 being made fast to the respective cylinders 76 of such devices 64 and 66.

As will be apparent from a consideration of FIGURES 1, 3, 5 and 6, the dog members 70 and 72 include portions 78 and 80 which are planar in configuration and are disposed in coplanar relation in the retracted position of the dog members of each composite dog. These portions 78 and 80 are proportioned to fit between adjacent handles 30 of adjacent plates and frames (or plates, in the case of recessed plates) in the manner indicated in FIGURE 5, and in practice are given a thickness so that they will be readily received within the existing space between the handles of adjacent plates and frames (which is ordinarily a minimum of ¼ inch).

In use, the plates and frames are separated by first releasing the movable head 18 and spacing it from the first plate 26 a suitable amount for cleaning purposes. The operator then grasps the trolley structure 42 and positions it with respect to the filter press so that the composite dog devices 60 and 62 will be vertically aligned with the space between the handles or arms 30 of the first two plates (or first plate and frame as the case may be). Pneumatic cylinder device 50 is then operated by operating control lever 90 to lower the composite dog devices 60 and 62 into horizontal alignment with the handles 30, after which the pusher dog members 70 are actuated by their cylinder devices 64 and 66 to simultaneously press against the handles 30 of the first plate 26, the reaction of which forces the hold-back dog members 72 against the handles 30 of the adjacent plate or frame, as the case may be. As the pistons of the air cylinder devices 64 and 66 start their strokes (thus forcing rods 74 outwardly thereof) the adherence of the first plate 26 with its next adjacent plate or frame (as the case may be) is broken and the first plate is then moved towards the slide head 18 to any spaced position desired.

Subsequent plates and frames are separated in like manner working toward the fixed head 14 until complete separation is effected.

After the plates and frames have been cleaned, and they are ready to be closed up into their assembled relation, this can be effected by apparatus 10 in the manner indicated in FIGURES 11 and 12. Under such circumstances, the plates and frames will be arranged in a consecutive manner with a space between the last plate or frame and the fixed head 14, and the slide head is disposed against the plates and frames at the other end of the press. Trolley structure 42 is then positioned so that the composite dog devices 60 and 62 are disposed in vertical alignment with the space between the handles 30 of the two plates (or plates and frames, as the case may be) that are disposed closest to the fixed head. The dogs are then lowered into position as before and the cylinder devices 64 and 66 actuated, which action causes the cylinder devices 64 and 66 to move the trolley structure 42 as well as the end plate or frame toward the fixed head 14 due to the fact that the movable dog member 70 cannot move forwardly because of the greater mass ahead of it. This action brings the end plate or frame into engagement with the fixed head and the repositioning of the plates and frames is repeated in a consecutive manner until all of the plates and frames have been shifted. At the last few plates, the mass of the slide head alone is sufficient to hold the dog member 70 from forward movement, this permitting completion of the closing operation.

FIGURE 8 illustrates an embodiment 10A that is especially adapted for use in connection with presses using lug type plates 26A, wherein the composite dog devices (only one is illustrated at 85, but the same device on the other side of the bridge 44A is similar) are swung into the space between the handles 30A from the sides of the press.

FIGURE 13 illustrates a variation 10B of the embodiment of FIGURE 8 which requires the use of only one raising cylinder.

It will thus be seen that the apparatus 10 operates only on the plate and frames that are directly involved in the separation procedure, and that they apply their forces to the structures intended to receive them, namely the handles or arms 30 or 30A, which require no modification over the shapes or styles conventionally employed. Thus, the application of the forces involved in effecting the separation of the individual plates and frames is localized directly to the structures to which they have to be applied, with the result that no modification of the plates or frames or the filter press is required and the structural arrangement of the device 10 is highly simplified.

*Specific description*

The frame 40 as illustrated generally comprises a pair of U-shaped frame members 100 and 102 which are connected together by tubular members 104 that form the respective trackways 46. This connection can be made by any suitable connecting device such as that generally indicated at 106 in FIGURE 2.

It is to be understood that the supports 100 and 102 are disposed on either side of a filter press such as that illustrated in FIGURE 4, although the frame 40 should be oriented so that the ends of the cylinder devices 64 and 66 carrying the dog devices 60 and 62 are directed toward the slide or movable head of the filter press.

Alternately, the frame may take the form of T-shaped supports to be disposed at either end of the press with channel members suspended from either arm of the T members above the press to which the individual tubular members 104 may be secured in any suitable manner. The channel members should be disposed so that their webs are vertically positioned for maximum bracing purposes, and members 104 may be secured to their respective channel members at spaced points therealong.

The tubular members 104 are open at each end so that the trolley structure 42 can be removed therefrom at each end of the trackways to permit the frame structure 40 to be moved from one filter press to another if so desired. As all the forces involved in the operation of the device 10 are confined to the space between the arms or handles of the plates and frames, the frame 40 can be a very simplified type structure of the general type illustrated and very light in weight so that it can be readily moved from place to place, its main function being to support the dead weight of the trolley structure and its load and provide for movement thereof lengthwise of the press.

The bridge 44 in the form illustrated comprises a channel member 110 having fixed to either end thereof plates 112 which are respectively connected to the roller assemblies 48 by links 114 pinned thereto as at 116. The roller devices 48 may be of any conventional type and in the form shown in FIGURE 3, they comprise a pair of rollers 118 and 120 journaled between the spaced plates 122 (only one plate 122 being shown) between which the links 114 are pinned.

The cylinder device 50 is mounted on the bridge 44 in any suitable manner and its piston rod 52 extends through a suitable opening in the bridge for connection to the beam or head 54 in any suitable manner.

In practice, cylinder device 50 may take the form of a commercially available double acting compressed air or other fluid operating device of the general type diagrammatically illustrated in FIGURE 7. Also mounted on bridge 44 is an air flow control valve 130 that in the form shown is affixed to angle bracket 132 in turn affixed to the bridge 44, and suitable air filtering and lubrication devices generally indicated by reference numeral 134 which may be of any conventional type.

Bridge 44 at one end thereof carries a composite bracket structure 136 including a depending panel portion 138 on which is mounted air flow control valve 140 that includes control handle 90 and hand grip 142 for convenience of manipulation by the operator. The valve 140 is a four-way control valve of the general type illustrated in FIGURE 7.

The beam or head 54 comprises a channel-shaped member 150 having affixed to either end thereof the respective bracket structures 56 and 58 that are identical in construction. The bracket structures 56 and 58 each comprises a horizontally disposed bar member 152 to either end of which is affixed the depending plates 154 and 156 that respectively carry at their lower end sleeves 158 and 160 in which the cylinder devices 64 and 66 are respectively mounted on either side of the beam or head 54. The cylinder devices 64 are made fast to the respective sleeves 158 and 160 in any suitable manner.

With regard to the dog devices 60 and 62, the members 70 thereof are secured to the respective piston rods 74, as between nuts 164 and 166 (see FIGURE 9). The movable dog members themselves each comprise in the form shown an angle member 168 defining a flange 170, to which the piston rod is fixed, and a flange 172 that is affixed as by welding to an L-shaped element 174 (these elements may alternately be incorporated in a single stamped unit) which forms the movable dog member planar portion 78. The lower arm 175 of element 174 is preferably given a tapered edge as indicated at 177 to provide some guiding action on the dog in being lowered into place, and also to enable the dog to be forced into place in the event the space available is a little short.

The hold-back dog member 72 comprises in the form illustrated a generally planar L-shaped element 176 that is affixed to its cylinder device 64 in any suitable manner, as by applying the cylinder end nut 178 against same. The laterally extending projection 180 of the element 176 is formed with an opening 182 which receives an elongated guide rod 184 that is affixed to the flange 170 of the movable dog member as by employing nuts 186 and 188.

The pistons 179 of the cylinders 64 and 66 at the ends of their retracted stroke engage the ends 181 of the respective cylinders 64 and 66. This forms a stop for disposing the planar portions 78 and 80 of the dog members 70 and 72 in coplanar relation in the initial operating positions of the respective devices 60 and 62, which should be disposed in this position in the retracted position of cylinders 64 and 66 by appropriately adjusting nuts 164 and 166.

As indicated in FIGURE 10, the L-shaped portion 174 and the leg 190 of the element 176 of the respective members 70 and 72 are in complementary inter-fitting relation in the initial starting position of the device. In the showing of FIGURE 10, the full line positions of the dog members 70 and 72 show these members as the movable dog member 70 as moving away from the hold-back dog member 72. The hold-back member 72 is shown in dashed lines where it is positioned with respect to the dog member 70 in the initial operating position of the device.

As indicated in FIGURE 2, the dog members 70 and 72 on either side of the device 10 are oppositely related, but otherwise the construction and general arrangement is the same. Consequently, a detailed description of the second dog device 62 is unnecessary.

The configuration of dog member 70 is significant as it is shaped to apply the forces involved as close to junction of the handles to the plates as possible and to spread out as much as practical the reaction forces acting on the handle.

The trolley structure head 54 is provided with one or more movement controlling guide rods 200 and 202, in which the guide rods 200 and 202 pass upwardly through appropriate perforations formed in the bridge 44. The guide rods 200 and 202 insure that the head 54 remains in coplanar relationship with the bridge 44 and thus remains disposed transversely of the filter press 12. Guide rod 202 may be eliminated if so desired as only one such structure is needed to maintain the relationship desired.

The cylinder devices 50, 64 and 66 are incorporated in an appropriate control system of the general type illustrated in FIGURE 7 which includes the four-way control valve 140 and off-on valve 130.

In the air system there illustrated, one part of control valve 140 is connected by lines 210, 211 and 212 to the head ends of air cylinder 50 and valve 130, respectively, the valve 130 being in the normally closed position. Valve 130 is connected to the head ends of the cylinder devices 64 and 66 by the appropriate lines indicated at 214, 216 and 218.

The other ends of the air cylinder devices 50, 64 and 66 are connected to the other port of control valve 140 by appropriate lines 220, 222, 224, 226 and 227 or their equivalents, and the valve 140 itself is appropriately connected to an appropriate source of compressed air indicated at 228, which may be a compressor on the order of that suitable for use in connection with paint sprayers and the like.

The four-way control valve 140 is arranged so that line 222 is normally open and connected to the source of air supply while line 210 is closed or vented, with the result that the trolley beam 54 is normally in its raised position and the pusher dog members 70 are normally in their retracted positions in coplanar relation with the dog members 72. Hand valve 90 functions to open line 210 to the source of air and vent line 222, which affects the supply of air to the head end of cylinder device 50 through the line 211 and supplies air under pressure to the valve 130.

As the trolley beam 54 lowers, a cam member 230 carried by the guide rod 200 engages cam follower 232 of valve 130 to open valve 130 and supply air to the head ends of the respective cylinder devices 64 and 66 whereby the pusher dog members 70 are urged away from their respective cylinder devices 64 and 66.

After the plate separation stroke is completed, the handle 90 is released and under a suitable spring biasing action valve 140 opens line 222 to the source of air under pressure and vents line 210, which restores the various parts to their initial positions.

The air system is arranged so that the sides of the system which are closed to the source of compressed air are open to the atmosphere, as will be apparent to any skilled mechanic. Also the system is arranged and the various parts proportioned so that the thrust applied to the handles of the plate or frame being shifted will be substantially equal.

The use of pneumatic devices to operate apparatus 10 is optional as hydraulics or other suitable motive systems are possible alternatives.

In the embodiment of FIGURE 8, the dog device 85 and its associated cylinder device 64 (not shown) are the same as previously described in connection with device 60. In this embodiment of the invention, the cylinder device is appropriately connected by arm 240 to an arm 241 of bell crank lever 242, through an appropriate fixed connection at 244 (which makes arm 241 functionally part of crank 242). The other arm 246 is appropriately connected to an appropriate air cylinder 248 that is arranged to swing the device 85 from a position to one side of the lug type plates 26A to the position shown wherein the planar components 78 and 80 of the device 85 are disposed between handles of adjacent plates.

In this embodiment of the invention, the other side of the bridge 44A is similarly equipped with an identical but reversed composite lug device for simultaneous action with the handles on the other side of the plates. The illustrated positioning of the dog devices 85 permits them to be applied under the lugs 249 of the special plates 26A.

In this embodiment of the invention, the cylinders 248 and those actuating the composite dog devices are incorporated in an air system similar to that of FIGURE 7 for positioning the respective composite lug devices between the handles of the plate to be shifted and those of its neighbor, after the dog devices have been vertically aligned with the space between such handles; then the movable dog members are moved in the manner previously described to effect separation of shifting of the plates involved. Closing of the plates may be effected following the same general procedure already indicated as modified from the standpoint of the different handling of devices 85 that is mentioned above.

The bridge 44A may be suspended from its trolleys in any appropriate manner permitting operation of the air cylinders 248 and the swinging of bell crank 242. For instance, the bridge 44A may be provided with a suitable framework structure indicated at 250, the horizontal member 252 of which has its ends connected to plates 112 of FIGURE 3 that are in turn connected to roller devices in the manner indicated in that figure.

In the arrangement of FIGURE 13 cylinder 260 is applied to bridge 44B between links 262 that are connected to bell cranks 242. Cylinder 260 on operation retracts piston rod 264 to swing the dog devices 85 from their extended positions to their operative positions, from which they are retracted by piston movement in the opposite direction (it being understood that the cylinders of apparatus 10B are incorporated in an air system similar to that of FIGURE 7).

It will therefore be seen that we have provided a method and device for separating plates and frames that is fully applicable to existing filter press equipment and requires no special design of the press or its plates or frames.

This method and device permit the plate separating and shifting function to be performed by one man without having to do any manual labor whatsoever other than shift the trolley structuer to appropriately position the composite lugs for application to the plates and frames to be shifted. Our device also insures the uniform application of pressure on either side of the plate or frame being shifted, thus avoiding inadvertent dislodgement of the plate or frame being shifted from the press frame.

It is believed that the device herein disclosed is the first practical plate shifter of a portable nature that can be applied to existing equipment, and that separates the plates by keeping the forces involved directed only to the plates or plates and frames that are to be separated.

One of the many practical benefits of our invention is that if the cake is dry enough, it will fall out due to the slight jarring action of dog member 70 in effecting separation of the adjacent recessed plates, thus greatly facilitating cleaning of the plates.

The stroke length employed for dog members 70 is largely optional and may be controlled in any suitable manner, such as by using cylinder devices having the desired stroke length.

In the appended claims the term "filter press units" means filter press plates and frames 26, 26A and 28 and their equivalences, including recessed plates.

The foregoing description and the drawings are given merely to explain and illustrate our invention and the invention is not to be limited thereto, except insofar as the appended claims are so limited, since those skilled in the art who have our disclosure before them will be able to make modifications and variations therein without departing from the scope of the invention.

We claim:
1. A device for separating the filter press units of filter presses comprising:
a pair of composite dogs,
each of said dogs comprising a pair of separate substantially planar members proportioned to be received in coplanar relation between the handles of adjacent filter press units mounted in their operative relation in a filter press,
means for disposing said dog pairs between the handles of an adjacent pair of filter press units, and
means for moving one member of each dog pair relative to the other member thereof and against the corresponding handles of one of the adjacent filter press units to separate the adjacent filter press units.

2. A device for separating the filter press units of filter presses comprising:
a beam member including means for disposing same crosswise of a filter press,
a pair of spaced apart composite dogs carried by said beam member,
each of said dogs comprising a pair of separate planar members proportioned to be received in substantial coplanar relation between the handles of adjacent filter press units mounted in their operative relation in a filter press,
means for positioning said dogs when in said coplanar relation between the handles of adjacent filter press units mounted in their operative relation in the filter press,
one dog member of each of said pair of dogs being movable transversely of said beam member relative to the other dog member thereof, and
means for substantially simultaneously forcing said movable dog members against the corresponding handles of an adjacent filter press unit to separate adjacent filter press units.

3. A device for separating the filter press units of filter presses of the type wherein the filter press units are suspended from handles on either side thereof between side bars and are adapted to be clamped between fixed and movable end heads, said device comprising:
a beam member extending crosswise of the filter press and mounted for movement longitudinally of the filter press, said beam member carrying a pair of spaced apart composite dogs, each of said dogs comprising a pair of separate planar members proportioned to be received in coplanar relation between the handles of adjacent filter press units of the filter press, one dog member of each of said pair of dogs being fixed against movement transversely of said beam member and the other dog member of each pair of dogs being movable transversely of said beam member, means for positioning said dogs respectively between the handles, on either side of the press, of the first pair of abutting filter press units adjacent a space created by separating the movable end head from the units, and power means for forcing said movable dog members transversely of said beam member against the corresponding handles of the filter unit next to the space to separate same from its abutting neighbor, whereby the separated filter unit moves toward the displaced movable head end and the units next in sequence to the separated unit in the direction of the fixed head are restrained from movement with the separated unit.

4. The device set forth in claim 3 wherein:
said movable dog member of each pair of dogs comprises an L-shaped member, and
the other dog member is proportioned to nest within the space defined by said L shaped member when the members of the respective dogs are in coplanar relation.

5. The device set forth in claim 3 including:
a trolley mounted for movement longitudinally of the filter press,
said beam being carried by said trolley.

6. The device set forth in claim 5 wherein:
said beam is secured to said trolley for vertical movement relative thereto, said dogs being respectively disposed in vertical alignment with the filter unit handles, and including means for raising and lowering said beam relative to said trolley to dispose said dogs between handles of adjacent filter units, said raising and lowering means comprising said dog positioning means.

7. The device set forth in claim 5 wherein:
said dogs are secured to said beam for swinging movement in a vertical plane with respect to said beam, and including means for swinging the respective dogs into and out of their operative positions between handles of adjacent filter units, said swinging means comprising asid dog positioning means.

References Cited

UNITED STATES PATENTS

| | | | |
|---|---|---|---|
| 672,505 | 4/1901 | Critchlow | 210—230 |
| 734,898 | 7/1903 | Lapp | 210—230 |
| 3,232,435 | 2/1966 | Fismer | 210—230 |
| 3,251,472 | 5/1966 | Kurita | 210—230 |
| 3,344,922 | 10/1967 | Kracklauer | 210—236 X |

FOREIGN PATENTS

| | | |
|---|---|---|
| 526,983 | 10/1921 | France. |
| 1,349,962 | 12/1963 | France. |
| 802,911 | 10/1958 | Great Britain. |
| 1,003,954 | 9/1965 | Great Britain. |
| 62,149 | 12/1948 | Netherlands. |

REUBEN FRIEDMAN, *Primary Examiner.*

C. M. DITLOW, *Assistant Examiner.*

U.S. Cl. X.R.

100—198; 210—236